(12) United States Patent
McCullough et al.

(10) Patent No.: US 9,073,008 B2
(45) Date of Patent: Jul. 7, 2015

(54) USE OF FERROUS SULFIDE SUSPENSION FOR THE REMOVAL OF MERCURY FROM FLUE GASES

(71) Applicant: Redox Technology Group, LLC, Carmel, IN (US)

(72) Inventors: Thomas P. McCullough, Carmel, IN (US); Gary Joel Meyer, Indianapolis, IN (US); Ralph E. Roper, Jr., Carmel, IN (US); Anthony J. Kriech, Indianapolis, IN (US)

(73) Assignee: Redox Technology Group, LLC, Indianapolis, IN (US)

( * ) Notice: Subject to any disclaimer, the term of this patent is extended or adjusted under 35 U.S.C. 154(b) by 0 days.

(21) Appl. No.: 14/200,661

(22) Filed: Mar. 7, 2014

(65) Prior Publication Data

US 2014/0255280 A1      Sep. 11, 2014

Related U.S. Application Data

(60) Provisional application No. 61/773,927, filed on Mar. 7, 2013.

(51) Int. Cl.
*B01D 53/64* (2006.01)
*C09K 3/00* (2006.01)
*B01D 53/80* (2006.01)

(52) U.S. Cl.
CPC ............... *B01D 53/64* (2013.01); *B01D 53/80* (2013.01); *B01D 2251/304* (2013.01); *B01D 2253/1128* (2013.01); *B01D 2257/602* (2013.01)

(58) Field of Classification Search
CPC .................................. B01D 53/64; C09K 3/00
USPC ......... 423/210; 95/134; 252/184, 191, 182.11, 252/183.11
See application file for complete search history.

(56) References Cited

U.S. PATENT DOCUMENTS

| | | | |
|---|---|---|---|
| 4,726,939 A | 2/1988 | Touro | |
| 4,915,818 A | 4/1990 | Yan | |
| 4,962,276 A | 10/1990 | Yan | |
| 5,037,552 A | 8/1991 | Furuta et al. | |

(Continued)

FOREIGN PATENT DOCUMENTS

JP      62-140629 A      6/1987

OTHER PUBLICATIONS

International Search Report and Written Opinion from corresponding PCT application No. PCT/US2014/021714 dated Jun. 24, 2014 (9 pgs).

*Primary Examiner* — Timothy Vanoy
(74) *Attorney, Agent, or Firm* — Brinks Gilson & Lione

(57) ABSTRACT

A wet gas scrubber liquor and method of using the same to remove mercury from flue gases. The wet gas scrubber liquid is an alkaline liquid suspension of ferrous sulfide particles that can be prepared by combining together a ferrous ion source such as ferrous chloride, a sulfide ion source such as sodium hydrosulfide and an alkalinity source such as sodium hydroxide. When used to scrub flue gases to remove mercury from flue gases the mercury reacts with said alkaline liquid suspension of ferrous sulfide particles and can be removed by at least one of: i) adsorption onto said ferrous sulfide particles; ii) adsorption onto iron (hydr)-oxides that form in said alkaline liquid suspension of ferrous sulfide particles; and iii) absorption by reacting with sulfur formed in alkaline liquid suspension of ferrous sulfide particles and forming mercuric sulfide as a precipitate.

19 Claims, 1 Drawing Sheet

(56) References Cited

U.S. PATENT DOCUMENTS

| | | |
|---|---|---|
| 6,284,199 B1 | 9/2001 | Downs et al. |
| 6,503,470 B1 | 1/2003 | Nolan et al. |
| 6,719,828 B1 | 4/2004 | Lovell et al. |
| 6,855,859 B2 | 2/2005 | Nolan et al. |
| 7,288,499 B1 | 10/2007 | Lovell et al. |
| 7,575,629 B2 | 8/2009 | Yang et al. |
| 7,704,920 B2 | 4/2010 | Yang et al. |
| 7,790,830 B2 | 9/2010 | Edmiston |
| 8,088,283 B2 | 1/2012 | Pate |
| 8,142,664 B2 | 3/2012 | Krogue et al. |
| 8,197,687 B2 | 6/2012 | Krogue et al. |
| 8,217,131 B2 | 7/2012 | Edmiston |
| 8,652,235 B2 | 2/2014 | Olsen et al. |
| 8,734,740 B1 | 5/2014 | Wang et al. |
| 2003/0091490 A1* | 5/2003 | Nolan et al. .................. 423/210 |
| 2007/0092418 A1* | 4/2007 | Mauldin et al. ............... 423/210 |
| 2007/0119300 A1 | 5/2007 | Yang et al. |
| 2012/0103912 A1* | 5/2012 | Hetherington et al. ....... 210/688 |
| 2012/0135214 A1* | 5/2012 | Dawes et al. ................. 428/219 |

* cited by examiner

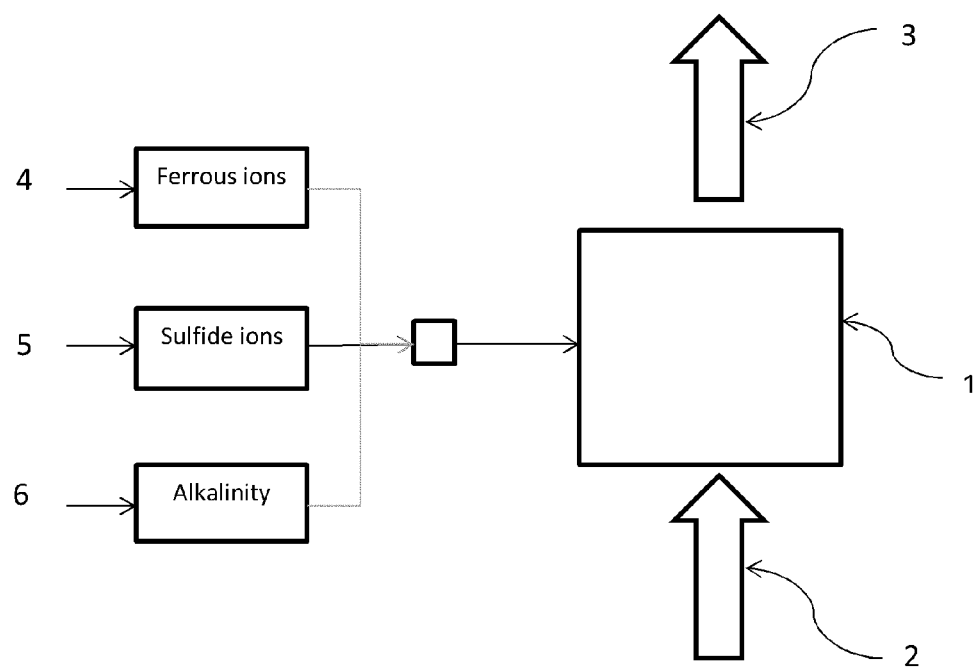

USE OF FERROUS SULFIDE SUSPENSION FOR THE REMOVAL OF MERCURY FROM FLUE GASES

RELATED APPLICATION

This application is based on U.S. Provisional Application Ser. No. 61/773,927, filed Mar. 7, 2013 to which priority is claimed under 35 U.S.C. §120.

BACKGROUND

The present invention relates generally to remediation of pollutants in flue gases. More specific embodiments of the present invention relate to a wet gas scrubbing liquor which comprises an alkaline ferrous sulfide suspension for the treatment and removal of mercury from flue gases, and methods of using the wet gas scrubbing liquor to remove mercury from flue gases.

The emission of pollutants from coal-fired and oil-fired boilers is a major environmental concern. In particular, the emission of mercury into the atmosphere from these coal-fired boilers has garnered increased attention as a threat to human health and the environment since mercury, even at low concentrations, is a neurotoxin. Mercury is contained in varying concentrations in different coal supplies and therefore the total quantity of mercury emitted into the atmosphere from the combustion of coal can vary significantly between facilities.

During combustion of the coal, mercury is released in the form of elemental mercury ($Hg^0$). As the combustion gases cool, a portion of the elemental mercury transforms to ionic or oxidized mercury ($Hg^{2+}$) in the gas stream. As a result, there are three possible forms of mercury in gas streams that may be emitted to the atmosphere—elemental ($Hg^0$), ionic or oxidized ($Hg^{2+}$), or mercury that is bound onto particulates or fly ash also contained in the gas stream ($Hg_{(p)}$).

The conversion of elemental mercury ($Hg^0$) to the other forms of mercury is dependent upon several factors including, but not limited to, the cooling rate of the gas stream, the presence of halogens or sulfurous species (e.g. chlorines, bromines, $SO_3^{2-}$), the amount and composition of fly ash, the presence of unburned carbon, and the removal efficiency of any installed air pollution control equipment. Considering the complex interaction of these various parameters, the form of mercury ultimately released to the atmosphere varies between 10% to 90%, 5% to 15%, and 10% to 90% of the total mercury for elemental, ionic, and particle bound species, respectively.

Mercury and other pollutants may be captured and removed from the gas stream by injection of a dry sorbent into the exhaust stream with subsequent collection in a particulate matter control device such as an electrostatic precipitator or a fabric filter. Systems based on dry sorbent technologies are collectively referred to as "dry scrubber" systems. Of the known dry sorbents for mercury removal, activated carbon and calcium-based sorbents have been the most actively studied and most widely used on a commercial scale.

Currently, the most commonly used sorbent in dry scrubber systems for mercury emission reduction is activated carbon that is injection in powder form into the flue gas stream of coal-fired and oil-fired plants. Although powdered activated carbon (PAC) is effective in capturing ionic or oxidized mercury species ($Hg^{+2}$), powdered activated carbon is not as effective for removal of elemental mercury ($Hg^0$) which can constitute a significant percentage of the mercury species in a flue gas, especially from facilities that burn subbituminous coals and lignite fuel sources. There have been efforts to enhance the trapping efficiency of elemental mercury ($Hg^0$) in these systems by incorporating or impregnating the PAC with a bromine species.

Examples of other sorbents that have been used for mercury removal in dry scrubber systems include those disclosed in U.S. Patent Application Publication No. 2003/0103882 to Olson et al. and in U.S. Pat. No. 6,719,828 to Lovell et al. which teaches the use of sorbents such as clays having metal sulfides interlayered between clay layers to enhance mercury removal. Other patents disclose mercury capture by injection of dry sorbents which involve technologies that are based upon preparation of the sorbents by thinly layering a chemical compound onto or into a substrate. These types of sorbents use substrates disclosed in U.S. Pat. Nos. 7,790,830, 8,119,759 and 8,217,131 all to Edmiston that involve sol-gel derivatives; U.S. Pat. No. 8,088,283 to Pate, U.S. Pat. No. 8,142,664 to Krogue et al. and U.S. Pat. No. 8,197,687 to Krogue et al. that involve self-assembled monolayers on mesoporous supports; and U.S. Pat. No. 7,288,499 to Lovell et al. that involves the use of phyllosilicates, and a variety of other substrates. U.S. Pat. Nos. 7,575,629 and 7,704,920 both to Yang et al. disclose any metal salt that can release a metal ion when the salt contacts a sulfide salt forming a water insoluble metal sulfide on a substrate surface can be used to produce an effective dry sorbent for mercury removal.

Overall the production and use of these types of sorbents used in dry scrubbers for the removal of mercury from flue gases are complex and expensive.

Another type of scrubber system used to reduce the emission of mercury and other toxic gaseous pollutants into the environment is commonly referred to as a "wet scrubber". In a wet scrubber system, polluted gases are brought into contact with a scrubbing liquid (scrubber liquor), either by spraying the gases with the liquid, by forcing the gases through a pool of liquid, or by some other contact method, so as to remove pollutants. The liquid compositions used in these wet scrubbers vary depending upon the pollutant targeted for removal. For example, in a wet flue gas desulfurization device (WFGD) used to remove acid gases such as sulfur dioxide ($SO_2$), a sorbent slurry containing limestone ($CaCO_3$), oxides or hydroxides of calcium or magnesium, or other mixtures are primarily used.

However, since elemental mercury is fairly insoluble in water (approximately 50 µg/L), elemental mercury is not effectively removed in wet scrubbers. Therefore, processes upstream of wet scrubbers that oxidize $Hg^0$ in flue gases to $Hg^{2+}$ will improve the effectiveness of overall mercury removal by the downstream wet scrubbers.

Since gas phase oxidation is kinetically limited, the need to oxidize any $Hg^0$ to $Hg^{2+}$, keeping any $Hg^{2+}$ from being reduced back to $Hg^0$ (sometimes referred to as "reconversion" or "re-emission"), and then finally capturing the $Hg^{2+}$ in the wet scrubber process is essential.

Reactions with other ionic species that may be present in the gas stream and scrubber liquid also may have a significant impact on the ability of wet scrubber systems to remove $Hg^{2+}$ and may effect the amount and rate of reconversion of $Hg^{2+}$ to $Hg^0$. In "Role of Sulfides in the Sequestration of Mercury by Wet Scrubbers," by B. Ghorishi et al. (Presented at the EPRI-DOE-EPA-AWMA Combined Power Plant Air Pollutant Control Mega Symposium Aug. 28-31, 2006 in Baltimore, Md.), the authors proposed that once $Hg^{2+}$ dissolves and ionizes in solution, it may subject to reactions with other dissolved constituents in a scrubber slurry. In the case of impurities such as divalent iron ($Fe^{2+}$), the authors theorized that the reduction of $Hg^{2+}$ to $Hg^0$ may occur by the following reaction:

$$2Fe^{2+}+Hg^{2+}\rightarrow Hg^0+2Fe^{3+} \quad (1)$$

Further, in the presence of aqueous sulfide ions, ionic or oxidized mercury ($Hg^{2+}$) precipitates as HgS and effectively sequesters the $Hg^{2+}$ as an insoluble solid according to the following reaction:

$$HS^-+Hg^{2+}\leftrightarrow HgS\downarrow+H^+ \quad (2)$$

Since reactions (1) and (2) occur simultaneously in wet scrubber systems, the amount of $Hg^0$ subject to re-emission (reconversion) becomes a "race between the mercury reduction reactions" and the precipitation of $Hg^{2+}$ as HgS. At $Fe^{2+}$ concentrations of less than 1300 ppm in the scrubber liquor, all of the mercury is in the form of HgS and thus no $Hg^0$ re-emission occurs. At higher $Fe^{2+}$ concentrations (more than 1300 ppm) and higher pH (>4), any mercury present has a greater tendency to be re-emitted as $Hg^0$.

Based on the above research, U.S. Pat. No. 6,284,199 to Downs et al., U.S. Pat. No. 6,503,470 to Nolan et al. and U.S. Pat. No. 6,855,859 to Nolan et al. each disclose methods to minimize the potential of this re-emission (reconversion) of the ionic or oxidized mercury ($Hg^{2+}$) at the gas/liquid interface before it can be reduced by transition metals that may be present as impurities in the scrubber liquid.

Various means for supplying an aqueous source of sulfide ions to react with the oxidized mercury at the gas/liquid interface in the wet scrubber for the absorption and precipitation of ionized (oxidized) mercury include injecting a mixture of air and hydrogen sulfide as disclosed in U.S. Pat. No. 6,284,199 to Downs et al., and addition into the scrubber liquid of aqueous sulfide species such as sulfidic waste water, kraft caustic liquor, kraft carbonate liquor, potassium sulfide and sodium sulfide. To further inhibit the reconversion of $Hg^{2+}$ to $Hg^0$, U.S. Pat. No. 6,855,859 to Nolan et al. discloses an additional step whereby an oxidizing agent is first added to the scrubber liquid to convert any $Hg^0$ present to $Hg^{2+}$ in the flue gas prior to treatment of the $Hg^{2+}$ with an aqueous sulfide ion.

In general the prior art related to mercury removal mechanisms by wet scrubbers systems rely upon absorption of ionic or oxidized mercury ($Hg^{2+}$) by an aqueous sulfide ion. In these cases, absorption is a phenomenon whereby atoms, molecules, or ions that are present in the gas stream are absorbed (taken up) by the volume of the bulk (liquid) phase. On the other hand, "adsorption" is a physical phenomenon where atoms, ions, or molecules from a gas, liquid, or dissolved solid adhere (bind) to another solid surface. The exact nature of the bonding by adsorption is dependent upon the species involved, but the adsorption process is generally classified as physisorption (characteristic of weak van der Waals forces), chemisorption (characteristic of covalent bonding), or some other type of electrostatic attraction. In other words, absorption is the process through which a substance, originally present in one phase, is removed from that phase by dissolution into another phase (typically a liquid), as opposed adsorption which is the accumulation of atoms, ions, or molecules from a bulk liquid or gas onto a solid surface.

The present invention overcomes the disadvantage of using sorbents in dry scrubbers which are primarily based on adsorption of mercury onto a sorbent and the disadvantage of wet scrubber systems which are based upon absorption of mercury by aqueous sulfide ions in the scrubber liquid to form an insoluble mercuric sulfide precipitant.

BRIEF SUMMARY

According to various features, characteristics and embodiments of the present invention which will become apparent as the description thereof proceeds, the present invention provides a method of removing mercury from a mercury-containing flue gas which method comprises the steps of:

providing alkaline liquid suspension of ferrous sulfide particles;

contacting a flue gas containing mercury with said alkaline liquid suspension of ferrous sulfide particles; and allowing mercury contained in the flue gas to react with said alkaline liquid suspension of ferrous sulfide particles and be removed by at least one of:

i) adsorption onto said ferrous sulfide particles;

ii) adsorption onto iron (hydr)-oxides that form in said alkaline liquid suspension of ferrous sulfide particles; and iii) absorption by reacting with sulfur formed in alkaline liquid suspension of ferrous sulfide particles and forming mercuric sulfide as a precipitate.

The present invention further provides an improvement for methods of using a wet gas scrubber to remove mercury from a flue gas, wherein the wet gas scrubbers have a scrubber liquor and are configured for receiving and scrubbing a flue gas with the scrubbing liquor, the improvement comprising providing as said scrubber liquor an alkaline liquid suspension of ferrous sulfide particles.

The present invention further provides a wet scrubber liquor composition for use in a wet gas scrubber to remove mercury from a flue gas, which comprises an alkaline liquid suspension of ferrous sulfide particles.

BRIEF DESCRIPTION OF THE DRAWINGS

The present invention will be described with reference to the attached drawings which are given as non-limiting examples only, in which:

FIG. 1 is a diagram of a process for removing mercury from a flue gas according to one embodiment of the present invention.

DETAILED DESCRIPTION OF THE DRAWINGS AND THE PRESENTLY PREFERRED EMBODIMENTS

The present invention relates to a wet gas scrubbing liquor which comprises an alkaline ferrous sulfide suspension for the treatment and removal of mercury from flue gases, and methods of using the wet gas scrubbing liquor to remove mercury from flue gases.

The alkaline ferrous sulfide suspension can be used as a wet scrubbing liquor for flue gases (or "wet gas scrubbing liquor") generated by coal-fired or oil-fired boilers.

The alkaline ferrous sulfide suspension can be produced by combining together a ferrous ion source (e.g. $FeCl_2$), a sulfide ion source (e.g. NaHS), and an alkalinity source (e.g. NaOH). According to further embodiments of the present invention the molar ratio of the ferrous ion source, sulfide ion source, and alkalinity source can be controlled/adjusted during the scrubbing of a flue gas so as to control/adjust the concentration of the insoluble ferrous sulfide (FeS).

The alkaline ferrous sulfide suspension can be used as a wet scrubbing liquor in any type of wet gas scrubber, including but not limited to venturi scrubbers, spray scrubbers, cyclone spray chambers, orifice scrubbers, impingement scrubbers, packed bed scrubbers, etc.

During the course of the present invention the inventors discovered that a liquid suspension of containing minimally soluble ferrous sulfide (FeS) efficiently and economically removes $Hg^{2+}$ by both absorption and adsorption mechanisms while simultaneously minimizing any reconversion of $Hg^{2+}$ to $Hg^0$.

Though the combination of various molar ratios of a ferrous ion source (e.g. $FeCl_2$), a sulfide ion source (e.g. NaHS), and an alkalinity source (e.g. NaOH), the resulting alkaline liquid suspension containing FeS particles provides an economical and efficient wet scrubber liquid suitable for mercury removal from gas streams.

Ferrous sulfide, sometimes referred to as mackinawite, disordered mackinawite, and amorphous ferrous sulfide disassociates according to the following reaction:

$$FeS \leftrightarrow Fe^{2+} + S^{2-} \quad (3)$$

Depending upon the environment in which ferrous sulfide is formed, the solubility product (Ksp) will be between $1 \times 10^{-3}$ and $1 \times 10^{-5}$. Since this is many orders of magnitude higher than the solubility product of HgS (Ksp=$3 \times 10^{-52}$), in the presence of $Hg^{2+}$ that is present (or formed) in a wet scrubber system, the formation HgS is favored and rapid. By providing the sulfide ion in the form of a minimally soluble ferrous sulfide solid particle, only the stoichiometric amount of sulfide will enter the wet scrubber liquid that is necessary to precipitate any $Hg^{2+}$ and other metals, if any that form metal sulfide precipitates. The advantage of the present invention when compared to the prior art, is the possibility of "over" or "under" dosing the required amount of sulfide necessary to precipitate the $Hg^{2+}$ is reduced.

Concurrent with the equilibrium mechanism controlling the concentration of sulfides released into the scrubber liquid, the same equilibrium mechanism also contributes in controlling the concentration of $Fe^{2+}$ ions in the scrubber liquid.

In accordance with reaction (3), since with each mole of sulfide ion released (required) into the scrubber liquid one mole of $Fe^{2+}$ is also released, the $Fe^{2+}$ concentration is contemporaneously controlled and, especially in the presence high oxygen flue gas concentrations, the potential reduction of any $Hg^{2+}$ to ($Hg^0$) is reduced in accordance with reaction (1).

In addition to the removal of aqueous $Hg^{2+}$ by combination with aqueous sulfide ions to form and insoluble HgS precipitate through absorption, the present invention also promotes removal of $Hg^{2+}$ through adsorption.

In a paper entitled "Sorption of Mercuric Ion by Synthetic Nanocrystalline Mackinawite (FeS)," by Hoon Y. Jeong, et al., (Environ. Sci. Technol. 2007 (41), 7699-7705), the authors concluded that in addition to absorption, an adsorption mechanism also contributes to the removal of $Hg^{2+}$ from aqueous solutions.

The removal mechanisms are dependent on the relative concentrations of $Hg^{2+}$ and FeS. When the molar ratio of $[Hg^{2+}]/[FeS]$ is as low as 0.05, adsorption is mainly responsible for $Hg^{2+}$ removal. As the molar ratio increases, the adsorption capacity becomes saturated and results in precipitation of HgS. Concurrently with HgS precipitation, released $Fe^{2+}$ from FeS is resorbed by an adsorption mechanism in the acidic pH range, and either adsorption or precipitation as Fe (hydr)-oxides at neutral to basic pHs. Subsequently, the Fe-precipitate formed at neutral to basic pHs may also serve as an adsorbent for $Hg^{2+}$.

The present invention allows for the ability to adjust the molar ratios of the ferrous ion source, sulfide ion source, and alkalinity source to produce a scrubber liquid in a real-time, continuous basis. The ability to adjust the concentration of insoluble FeS in suspension, the ability to produce scrubber solutions with specified concentrations of ferrous ions (or sulfide ions) by adjusting the stoichiometry of the feedstocks, pH, or combinations of both offers unique flexibility that was not heretofore possible or foreseen.

FIG. 1 is a diagram of a process for removing mercury from a flu gas according to one embodiment of the present invention. As depicted in FIG. 1 a source of ferrous ions (e.g. $FeCl_2$) 4, a source of sulfide ions (e.g. NaHS) 5, and an alkalinity source (e.g. NaOH) 6 are combined together to produce an alkaline liquid suspension of ferrous sulfide particles. The alkaline liquid suspension of ferrous sulfide particles is used as a wet scrubber liquor in a wet gas scrubber 1 through which a flue gas stream 2 is passed to produce a cleaned gas stream 3.

The process depicted in FIG. 1 allows for control/adjustment of the molar ratio of the ferrous ion source, sulfide ion source, and alkalinity source during processing so as to allow for real time control/adjustment of the concentration of the insoluble ferrous sulfide (FeS) in the wet scrubbing liquor.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

The invention claimed is:

1. A method of removing mercury from a mercury-containing flue gas which method comprises the steps of:
   providing alkaline liquid suspension of ferrous sulfide particles;
   contacting a flue gas containing mercury with said alkaline liquid suspension of ferrous sulfide particles; and
   allowing mercury contained in the flue gas to react with said alkaline liquid suspension of ferrous sulfide particles and be removed by at least one of:
   i) adsorption onto said ferrous sulfide particles;
   ii) adsorption onto iron (hydr)-oxides that form in said alkaline liquid suspension of ferrous sulfide particles; and
   iii) absorption by reacting with sulfur formed in alkaline liquid suspension of ferrous sulfide particles and forming mercuric sulfide as a precipitate.

2. A method of removing mercury from a mercury-containing flue gas according to claim 1, wherein said step of providing alkaline liquid suspension of ferrous sulfide particles comprises combining together a ferrous ion source, a sulfide ion source and an alkalinity source to form said alkaline liquid suspension of ferrous sulfide particles.

3. A method of removing mercury from a mercury-containing flue gas according to claim 2, wherein said step of providing alkaline liquid suspension of ferrous sulfide particles comprises combining together ferrous chloride, sodium hydrosulfide and sodium hydroxide to form said alkaline liquid suspension of ferrous sulfide particles.

4. A method of removing mercury from a mercury-containing flue gas according to claim 2, further comprising controlling the amount of at least one of the ferrous ion source, the sulfide ion source and the alkalinity source so as to control a ratio of ionic mercury to ferrous sulfide in the alkaline liquid suspension of ferrous sulfide particles.

5. A method of removing mercury from a mercury-containing flue gas according to claim 3, further comprising controlling the amount of at least one of the ferrous chloride, sodium hydrosulfide and sodium hydroxide so as to control a ratio of ionic mercury to ferrous sulfide in the alkaline liquid suspension of ferrous sulfide particles.

6. A method of removing mercury from a mercury-containing flue gas according to claim 1, wherein the alkaline liquid suspension of ferrous sulfide particles inhibits reconversion of ionic or oxidized mercury to elemental mercury.

7. A method of removing mercury from a mercury-containing flue gas according to claim 1, wherein the step of contacting the flue gas containing mercury with said alkaline liquid suspension of ferrous sulfide particles is performed in a wet scrubber system.

8. A method of removing mercury from a mercury-containing flue gas according to claim 1, wherein the solubility of the ferrous sulfide particles is between about $1\times10^{-3}$ and $1\times10^{-5}$.

9. In a method of using a wet gas scrubber to remove mercury from a flue gas, said wet gas scrubber having a scrubber liquor and being configured for receiving and scrubbing said flue gas with the scrubbing liquor, the improvement comprising providing as said scrubber liquor an alkaline liquid suspension of ferrous sulfide particles which removes mercury from the flue gas by at least one of:
   i) adsorption onto said ferrous sulfide particles;
   ii) adsorption onto iron (hydr)-oxides that form in said alkaline liquid suspension of ferrous sulfide particles; and
   iii) absorption by reacting with sulfur formed in alkaline liquid suspension of ferrous sulfide particles and forming mercuric sulfide as a precipitate.

10. A method of using a gas wet scrubber to remove mercury from a flue gas according to claim 9, wherein the step of providing alkaline liquid suspension of ferrous sulfide particles comprises combining together a ferrous ion source, a sulfide ion source and an alkalinity source to form said alkaline liquid suspension of ferrous sulfide particles.

11. A method of using a wet gas scrubber to remove mercury from a flue gas according to claim 9, wherein the step of providing alkaline liquid suspension of ferrous sulfide particles comprises combining together ferrous chloride, sodium hydrosulfide and sodium hydroxide to form said alkaline liquid suspension of ferrous sulfide particles.

12. A method of using a wet gas scrubber to remove mercury from a flue gas according to claim 10, further comprising controlling the amount of at least one of the ferrous ion source, the sulfide ion source and the alkalinity source so as to control a ratio of ionic mercury to ferrous sulfide in the alkaline liquid suspension of ferrous sulfide particles.

13. A method of using a wet gas scrubber to remove mercury from a flue gas according to claim 11, further comprising controlling the amount of at least one of the ferrous chloride, sodium hydrosulfide and sodium hydroxide so as to control a ratio of ionic mercury to ferrous sulfide in the alkaline liquid suspension of ferrous sulfide particles.

14. A method of using a wet gas scrubber to remove mercury from a flue gas according to claim 9, wherein the alkaline liquid suspension of ferrous sulfide particles inhibits reconversion of ionic or oxidized mercury to elemental mercury.

15. A method of using a wet gas scrubber to remove mercury from a flue gas according to claim 9, wherein the solubility of the ferrous sulfide particles is between about $1\times10^{-3}$ and $1\times10^{-5}$.

16. A wet scrubber liquor composition for use in a wet gas scrubber to remove mercury from a flue gas, which comprises an alkaline liquid suspension of ferrous sulfide particles.

17. A wet scrubber liquor composition for use in a wet gas scrubber to remove mercury from a flue gas according to claim 16, which is produced by combining together a ferrous ion source, a sulfide ion source and an alkalinity source.

18. A wet scrubber liquor composition for use in a wet gas scrubber to remove mercury from a flue gas according to claim 16, which is produced by combining together ferrous chloride, sodium hydrosulfide and sodium hydroxide.

19. A wet scrubber liquor composition for use in a wet gas scrubber to remove mercury from a flue gas according to claim 16, wherein the solubility of the ferrous sulfide particles is between about $1\times10^{-3}$ and $1\times10^{-5}$.

\* \* \* \* \*